(12) United States Patent
Feneyrou et al.

(10) Patent No.: US 12,313,792 B2
(45) Date of Patent: May 27, 2025

(54) FREQUENCY-MODULATED COHERENT LIDAR

(71) Applicant: THALES, Courbevoie (FR)

(72) Inventors: Patrick Feneyrou, Palaiseau (FR);
Jérôme Bourderionnet, Palaiseau (FR);
Daniel Dolfi, Orsay (FR)

(73) Assignee: THALES, Courbevoie (FR)

( * ) Notice: Subject to any disclaimer, the term of this patent is extended or adjusted under 35 U.S.C. 154(b) by 202 days.

(21) Appl. No.: 18/267,762

(22) PCT Filed: Dec. 10, 2021

(86) PCT No.: PCT/EP2021/085179
§ 371 (c)(1),
(2) Date: Jun. 15, 2023

(87) PCT Pub. No.: WO2022/128782
PCT Pub. Date: Jun. 23, 2022

(65) Prior Publication Data
US 2024/0004043 A1  Jan. 4, 2024

(30) Foreign Application Priority Data
Dec. 17, 2020  (FR) ...................................... 2013477

(51) Int. Cl.
*G01S 7/4912* (2020.01)
*G01S 7/481* (2006.01)
(Continued)

(52) U.S. Cl.
CPC ........... *G01S 7/4917* (2013.01); *G01S 7/4811* (2013.01); *G01S 17/34* (2020.01); *G01S 17/58* (2013.01)

(58) Field of Classification Search
CPC ...... G01S 7/4917; G01S 7/4811; G01S 17/34; G01S 17/58; G01S 7/497; G01S 17/95; Y02A 90/10; G01J 9/04
(Continued)

(56) References Cited

U.S. PATENT DOCUMENTS 10,317,288 B2   6/2019  Minet et al.
2012/0002189 A1* 1/2012  Bengoechea Apezteguia .............
                                                    G01F 1/661
                                                      356/28.5

FOREIGN PATENT DOCUMENTS

EP   3 026 455 A1   6/2016
WO   2018/122339 A1 7/2018

OTHER PUBLICATIONS

Abdelazim, et al., "Development and Operational Analysis of an All-Fiber Coherent Doppler Lidar System for Wind Sensing and Aerosol Profiling", IEEE Transactions on Geoscience and Remote Sensing, vol. 53, Issue: 12, pp. 6495-6506, 2015.
(Continued)

*Primary Examiner* — Seung C Sohn
(74) *Attorney, Agent, or Firm* — BakerHostetler

(57) ABSTRACT

A method for processing a signal from a coherent lidar comprising a periodically frequency-modulated coherent source (L), the method includes the following steps: A decomposing each modulation period indexed j into a plurality of intervals indexed i, and determining, for each interval Iij, an elementary power spectral density DSP(i,j) of the beat signal over the interval, B determining an average power spectral density over j DSP(i), C determining a lower frequency bound of the average power density DSP(i) and an upper frequency bound, D determining a distance dk(i) and a velocity of the fluid vk(i) from the lower and upper bounds.

13 Claims, 12 Drawing Sheets

(51) Int. Cl.
*G01S 17/34* (2020.01)
*G01S 17/58* (2006.01)

(58) Field of Classification Search
USPC .......................................................... 356/445
See application file for complete search history.

(56) References Cited

OTHER PUBLICATIONS

Feneyrou et al., "Frequency-modulated multifunction lidar for anemometry, range finding, and velocimetry-1. Theory and signal processing", Appl. Opt., vol. 56, No. 35, pp. 9663-9675, 2017.
Feneyrou et al., "Frequency-modulated multifunction lidar for anemometry, range finding, and velocimetry-2. Experimental results", Appl. Opt., vol. 56, No. 35, pp. 9676-9685, 2017.

\* cited by examiner

FREQUENCY-MODULATED COHERENT LIDAR

CROSS-REFERENCE TO RELATED APPLICATIONS

This application is a National Stage of International patent application PCT/EP2021/085179, filed on Dec. 10, 2021, which claims priority to foreign French patent application No. FR 2013477, filed on Dec. 17, 2020, the disclosures of which are incorporated by reference in their entirety.

FIELD OF THE INVENTION

The present invention relates to the measurement of the characteristics of a moving fluid (distance, velocity) with a frequency-modulated continuous-wave coherent lidar.

BACKGROUND

The measurement of a moving fluid such as the atmosphere, which corresponds to measuring a wind profile, is conventionally carried out through Doppler shift analysis on the signal backscattered by aerosols present in the atmosphere using a pulsed lidar. Measuring the time of a round trip of a pulse (200 ns class) gives the distance information d, and the Doppler shift associated with this pulse gives the radial velocity information v(d), equal to the projection of the velocity vector onto the illumination axis of the lidar.

This pulsed lidar technique is widely proven and used commercially (see for example document EP3026455). For some applications (for example wind field mapping for snipers), it is necessary to have an extremely compact and lightweight system, even if this means restricting the requirement level in terms of performance and/or range. However, the emission of pulses leads to the use of fiber amplifiers and fiber components. The size of these systems may be reduced using photonic integrated circuits (PIC), but the flux withstand of such devices prevents the use of high peak power.

One alternative solution concerns the use of frequency-modulated continuous-wave lidar, the use of which is well known in the context of telemetry/velocimetry measurements on hard targets and which makes it possible, given the low peak powers, to use PICs. The operating principle of such a lidar, which is well known from the prior art, is recalled below.

A coherent lidar as illustrated in FIG. 1 comprises a coherent source L, typically a laser that emits a coherent light wave (IR, visible or near UV region), an emission device DE that makes it possible to illuminate a volume of space, and a reception device DR, which collects a fraction of the light wave backscattered by a target T. The Doppler frequency shift $v_{Dop}$ of the backscattered wave is a function of the radial velocity v of the target T.

On reception, the received backscattered light wave S of frequency fs is mixed with part of the emitted wave, called wave OL for "local oscillator". The interference of these two waves is detected by a photodetector D, and the electrical signal at the output of the detector has an oscillating term called beat signal Sb, in addition to terms proportional to the received power and to the local oscillator power. A processing unit UT0 digitizes this signal and extracts therefrom the velocity information v of the target T.

Preferably, the processing unit electronically filters the beat signal Sb in a narrow band centered on the zero frequency, in the absence of a frequency shift.

For coherent lidars, the emission and reception devices preferably use the same optics (monostatic lidar). This characteristic makes it possible to obtain good mechanical stability and to reduce the influence of atmospheric turbulence at long distances, the propagation paths of the incident and backscattered waves being coincident.

One lidar-based telemetry/velocimetry solution consists in implementing a frequency-modulated system. This technique, which is conventional in radar, is of particular interest at present given the progress of fiber laser sources. By virtue of frequency modulation, time/frequency analysis makes it possible to recover the distance d from the target and its velocity v. This type of lidar also makes it possible to perform a laser anemometry function.

One example of optical architecture of a frequency-modulated lidar 20 is described in FIG. 2. The coherent source is frequency-modulated such that the frequency of the local oscillator is modulated according to a predetermined function, called waveform, which is controlled by the module WFC, which is synchronized with the processing unit UT0. In combination with the module WFC, a device ID, which is typically an unbalanced interferometer (length of the two arms is not the same), makes it possible to measure the optical frequency at the output of the laser, which is then injected into the module WFC (see document U.S. Ser. No. 10/317,288).

The optical signal at emission is amplified by an amplifier EDFA, emission and reception use the same optics O and are separated using a circulator C. This optical signal may possibly be frequency-shifted, for example using an acousto-optic modulator that is preferentially positioned upstream of the amplifier EDFA but may also be positioned on the path of the local oscillator. In this case, the electronic filtering in the processing unit is performed around the shift frequency. A delay line LR makes it possible to equalize the optical paths of the local oscillator and of the emission signal so as to filter out, in the RF domain, defects with the optical components placed downstream of the amplifier EDFA (crosstalk defect with the circulator C, imperfections of the anti-reflection processing operations of the emission/reception optics O, etc.).

FIG. 3 illustrates the operating principle of a frequency-modulated coherent lidar according to the prior art.

We adopt the scenario in the description below where the optical emission frequency and that of the local oscillator are not shifted using an acousto-optic modulator. The frequency of the local oscillator $f_{OL}$ is linearly modulated with two frequency slopes $\alpha_1$ and $\alpha_2$, periodically with a period $T_{FO}$. This optical frequency $f_{OL}$ may be written as the sum of a constant optical frequency f0 (here the initial frequency of the laser) and a time-dependent modulation frequency in the radiofrequency domain $f_{mod}(t)$ resulting from the modulation of the laser source:

$$f_{OL}(t) = f0 + f_{mod}(t)$$

FIG. 3 illustrates the variation over time of the frequencies $f_{OL}(t)$ and $f_s(t)$, the optical frequency f0 having been subtracted for greater clarity. As illustrated in the figure at the top a), the backscattered signal of frequency fs(t) is time-shifted by a time τ due to the propagation to the measurement region (target T) and therefore related to the distance from the target d, and is frequency-shifted by a value $v_{Dop}$ due to the Doppler effect with respect to the local oscillator frequency $f_{OL}(t)$.

The detected beat signal Sb has a frequency component $fs - f_{OL}$. The figure at the bottom b) illustrates the evolution over time of $fs - f_{OL}$. It may be seen that this frequency difference comprises, as a function of time, two series of plateaus at the characteristic frequencies $v_{\alpha 1}$ and $v_{\alpha 2}$, directly related to the distance from the target D and its radial velocity v by the equations:

$$v_{\alpha_1} = \frac{2v}{\lambda} - \frac{2\alpha_1 D}{c} \text{ and } v_{\alpha_2} = \frac{2v}{\lambda} - \frac{2\alpha_2 D}{c} \quad (1)$$

Measuring these two characteristic frequencies $v_{\alpha 1}$ and $v_{\alpha 2}$ of the beat signal Sb makes it possible to recover d and v. The characteristic frequencies are conventionally measured by determining the power spectral density DSP of the beat signal Sb, typically corresponding to the norm (modulus squared) of a Fourier transform thereof (in practice an FFT or fast Fourier transform). The payload information is thus located here on the plateaus of the signal of FIG. 3 b).

$$DSP=|TF[Sb]|^2$$

However, having continuous emission on a diffuse target (and no longer a hard target as previously) makes signal processing extremely tricky. Indeed, the information from the various atmospheric layers leads to ambiguities in a frequency representation since, at a given time, the beat signal comprises a continuum of instantaneous frequencies resulting from backscattering from the various layers of the fluid.

A frequency-modulated continuous-wave lidar has however been described in the documents below for a measurement in a diffuse medium but with a focused beam, to ascertain wind in a given plane (the focal plane).

P. Feneyrou et al, "Frequency-modulated multifunction lidar for anemometry, range finding, and velocimetry-1. Theory and signal processing," Appl. Opt. 56, 9663-9675 (2017)

P. Feneyrou et al, "Frequency-modulated multifunction lidar for anemometry, range finding, and velocimetry-2. Experimental results," Appl. Opt. 56, 9676-9685 (2017)

However, in these documents, the processing that is used does not make it possible to deduce, from measurements, the profile of the wind at different distances (unless there is a variation in focus over time, which is too complex to implement).

SUMMARY OF THE INVENTION

One aim of the present invention is to rectify the above-mentioned drawbacks by proposing a signal processing method, and an associated lidar, that make it possible to isolate the backscatter from the various layers of fluid and thus to obtain a telemetric/velocimetric measurement v(d) while maintaining a low peak power.

One subject of the present invention is a method for processing a signal from a coherent lidar comprising a periodically frequency-modulated coherent source (L),
a beat signal being generated by a photodetector from the interference between an optical signal, called local oscillator, having a local oscillator frequency and an optical signal backscattered by a moving fluid illuminated by the lidar,
the local oscillator frequency consisting of the sum of an average value and a modulation frequency resulting from the modulation of the source, the modulation frequency being periodic according to a modulation period, each period comprising K linear parts having K frequency slopes indexed $\alpha_k$, respectively, K being even and greater than or equal to 2,
said beat signal being digitized at a sampling frequency fern over a duration at least equal to M times the modulation period, a sampled modulation period being indexed j, j varying from 1 to M,
the method comprising the following steps:

A decomposing each modulation period indexed j ($T_{FO}$ (j)) into a plurality of intervals indexed i, i varying from 1 to N, and determining, for each interval Iij, an elementary power spectral density DSP(i,j) of the beat signal over said interval, B determining an average power spectral density over j DSP(i), C the N values of i being distributed over $T_{FO}$ into K intervals Ek, k varying from 1 to K, an interval Ek corresponding to a slope value $\alpha_k$ and comprising pk values of i, determining, for at least one value of i within an interval Ek, with k being odd, a lower frequency bound, called $f_{Bk}(i)$, of said average power density DSP(i) and an upper frequency bound, called $f_{Hk}(i+pk)$, of the average power density DSP(i+pk), D determining, for said value of i, a distance dk(i) and a velocity of the fluid vk(i) at said distance from said lower and upper frequency bounds.

According to one embodiment, K=2 or K=4 and $\alpha_{2k}=-\alpha_{2k-1}$.

According to one embodiment, said distance dk(i) and said velocity vk(i) are determined for a plurality of values of i of the interval Ek, so as to obtain a function v=f(d).

According to one embodiment, K is greater than or equal to 4, a plurality of distances and a plurality of velocities are determined, these being determined from a plurality of intervals Ek, with k being odd, and the method comprises an additional step E of determining a final distance and velocity by taking an average over the plurality of distances and the plurality of velocities, respectively.

According to one embodiment, $p_{k+2}=p_k$, with k being odd.

According to one embodiment, each elementary power spectral density is determined from a fast Fourier transform (FFT) of the beat signal.

According to one embodiment, an interval Iij comprises $N_{FFT}$ sampling points, and the following relationships exist: for a chosen distance resolution $\delta R$:

$$2 \cdot \delta R = \frac{c \cdot N_{FFT}}{f_{ech}}$$

for a chosen velocity resolution $\delta V$:

$$\frac{f_{ech}}{N_{FFT}} = \frac{2 \cdot \delta V}{\lambda}$$

where C is the speed of light and $\lambda$ is the wavelength of the coherent source.

According to one embodiment, an interval Iij comprises $N_{FFT}$ sampling points and, for a predetermined measured velocity $v_{max}$, the following condition exists:

$$\alpha_k > \frac{2v_{max}}{\lambda} \frac{f_{ech}}{N_{FFT}}$$

where $\lambda$ is the wavelength of the coherent source.

According to one embodiment, said fluid is the atmosphere comprising scattering particles, said method then making it possible to determine a wind profile along an illumination axis of the lidar.

According to another aspect, the invention relates to a coherent lidar system comprising:
- a periodically frequency-modulated coherent source (L),
- an emission device (DE) for emitting an optical signal from the coherent source and a reception device (DR) for receiving a signal backscattered by a moving fluid (F) illuminated by the lidar,
- a photodetector (D) configured to generate a beat signal (Sb) from the interference between an optical signal, called local oscillator, having a local oscillator frequency ($f_{OL}(t)$) and the backscattered optical signal, the local oscillator frequency ($f_{OL}(t)$) consisting of the sum of an average value (f0) and a modulation frequency ($f_{mod}(t)$) resulting from the modulation of the coherent source, the modulation frequency being periodic according to a modulation period ($T_{OF}$), each period comprising K linear parts having K frequency slopes ($\alpha k$), respectively, K being even and greater than or equal to 2,
- a processing unit (UT) configured to:
  digitize the beat signal at a sampling frequency $f_{ech}$ over a duration at least equal to M times the modulation period, a sampled modulation period being indexed j, j varying from 1 to M,
  decompose each modulation period indexed j (TFO(j)) into a plurality of intervals indexed i, i varying from 1 to N, and determine, for each interval Iij, an elementary power spectral density DSP(i,j) of the beat signal over said interval,
  determine an average power spectral density over j DSP (i),
  the N values of i being distributed over TFO into K intervals Ek, k varying from 1 to K, an interval Ek corresponding to a slope value αk and comprising pk values of i, determine, for at least one value of i within an interval Ek, with k being odd, a lower frequency bound, called fBK(i), of the average power density DSP(i) and an upper frequency bound, called fHK(i+pk), of the average power density DSP(i+pk),
  determine, for said value of i, a distance dk(i) and a velocity of the fluid vk(i) at said distance from said lower and upper frequency bounds (fBk(i), fHk(i+pk)).

According to one embodiment, the coherent lidar system furthermore comprises
an isolator, an amplifier for amplifying the coherent source and an unbalanced interferometer for measuring the optical frequency at the output of the laser, a first sampling component for directing a fraction of the source toward the unbalanced interferometer and a second sampling component for implementing the local oscillator, and the first and second sampling components are arranged downstream of the amplifier.

According to one embodiment, the isolator, the unbalanced interferometer and the detector are produced using micro-optics and/or the unbalanced interferometer and the detector are produced as a photonic integrated circuit.

According to another aspect, the invention relates to a computer program product, said computer program comprising code instructions for performing the steps of the processing method according to the invention.

The following description presents a number of exemplary embodiments of the device of the invention: these examples do not limit the scope of the invention. These exemplary embodiments contain not just essential features of the invention but also additional features related to the embodiments in question.

BRIEF DESCRIPTION OF THE DRAWINGS

The invention will be better understood and other features, aims and advantages thereof will become apparent from the detailed description that follows and that is given with reference to the appended drawings, which are given by way of non-limiting examples and in which.

DETAILED DESCRIPTION

Figure 1:
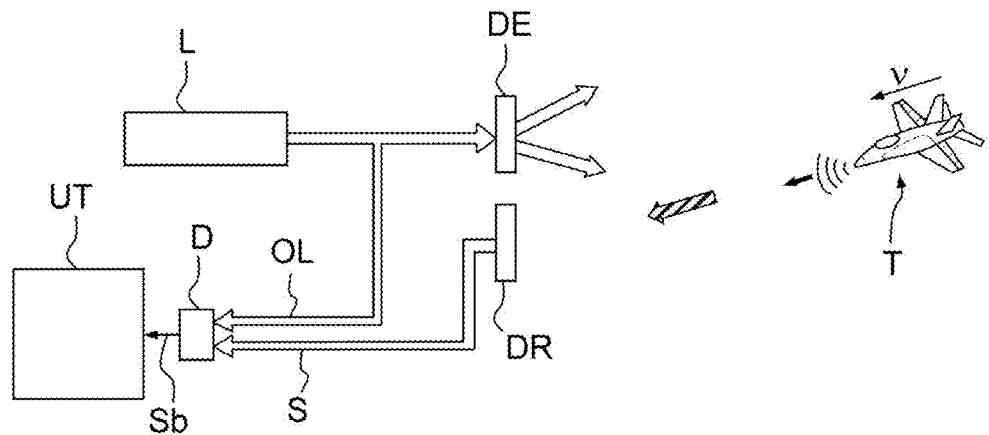
FIG. 1, already mentioned, illustrates the principle of a coherent lidar.
Figure 2:
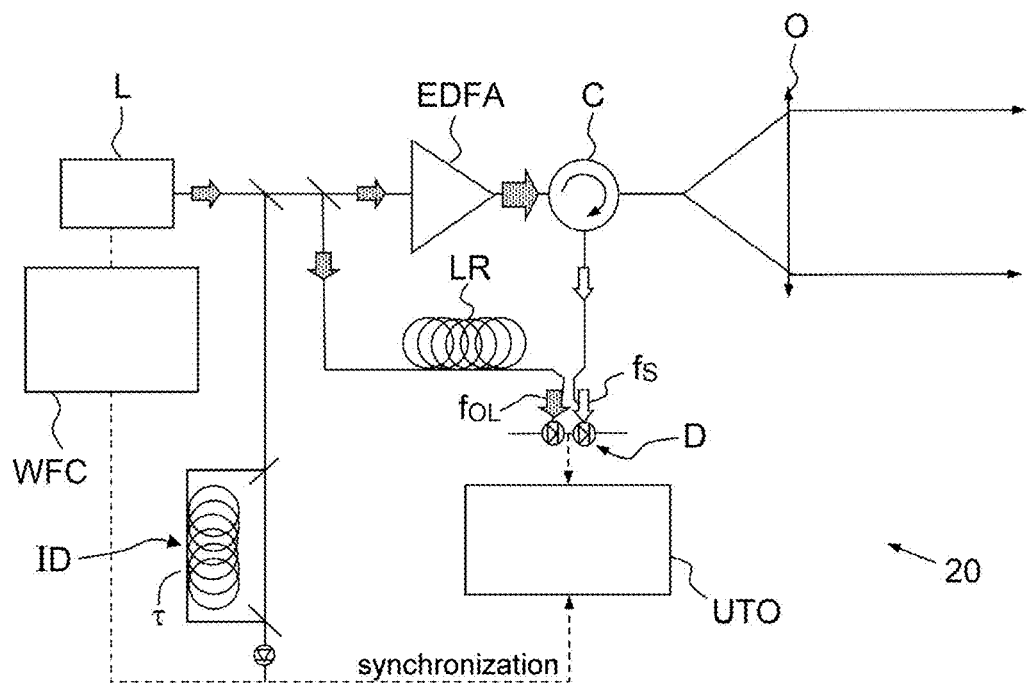
FIG. 2, already mentioned, illustrates a monostatic frequency-modulated coherent lidar in more detail.
Figure 3:
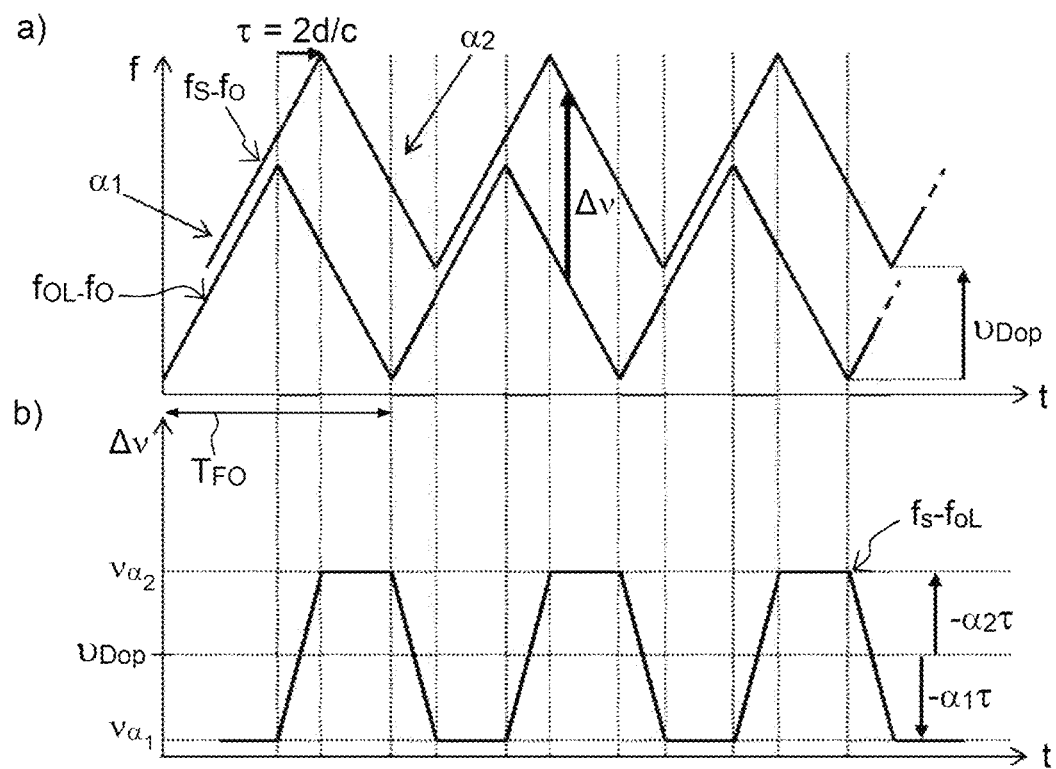
FIG. 3, already mentioned, illustrates the operating principle of a frequency-modulated coherent lidar according to the prior art.

In the invention, the hardware component is conventional. Use is made of a coherent lidar, the principle of which is to cause a local oscillator to beat using the wave backscattered on a detector, as described in FIG. 2. The invention thus relates to a method 50 for processing a signal from a coherent lidar comprising a periodically frequency-modulated coherent source L. The beat signal Sb is generated by a photodetector D from the interference between an optical signal, called local oscillator, having a local oscillator frequency $f_{OL}(t)$ and an optical signal backscattered by a moving fluid F (scattering particles P) illuminated by the lidar. The local oscillator frequency $f_{OL}(t)$ is formed by the sum of an average value f0 and a modulation frequency fmod(t) resulting from the modulation of the source. The modulation frequency is periodic according to a modulation period $T_{FO}$, each period comprises K linear parts having K frequency slopes indexed αk, respectively, k varying from 1 to K, K being even and greater than or equal to 2.

For K=2, there are 2 slopes α1 and α2.

For K=4, there are 4 slopes α1, α2, α3, α4.

Simplification of the processing is achieved when the values of slopes satisfy the relationship: $\alpha_{2k}=-\alpha_{2k-1}$ for the values of k in question.

That is to say, for K=2 α2=−α1, and for K=4 α2=−α1 and α4=−α3.

Conventionally, the calibration of this waveform is fundamental and may be achieved using an unbalanced interferometer ID. Here, the optics O illuminate a fluid F, and no longer a hard target.

In a manner conventional for a telemetry/velocimetry FMCW lidar (and unlike the FMCW lidar for performing a wind measurement in a given plane mentioned above), the beam is preferentially collimated with a mode of a size fixed by the range of the equipment.

The low-power signals of the lidar are:
The local oscillator, which typically has a power of 1 to 10 mW,
the power required in the unbalanced interferometer, which is typically of the class 0.1 to 10 mW,
the backscattered signal, which depends on the characteristics of the laser and the intended target, but it very generally remains well below 1 mW.

The high-power signal is the signal from the amplifier EDFA and used to illuminate the fluid.

The method for processing the temporal beat signal Sb according to the invention is also based on determining power spectral densities, from fast Fourier transforms (FFT). However, the waveform and Fourier transform characteristics differ from what is commonly employed so as to exploit a characteristic of the interference that has not been exploited until now.

In the remainder of this document, in-phase and quadrature detection is preferably implemented, thereby greatly simplifying the processing according to the invention.

Figure 4:
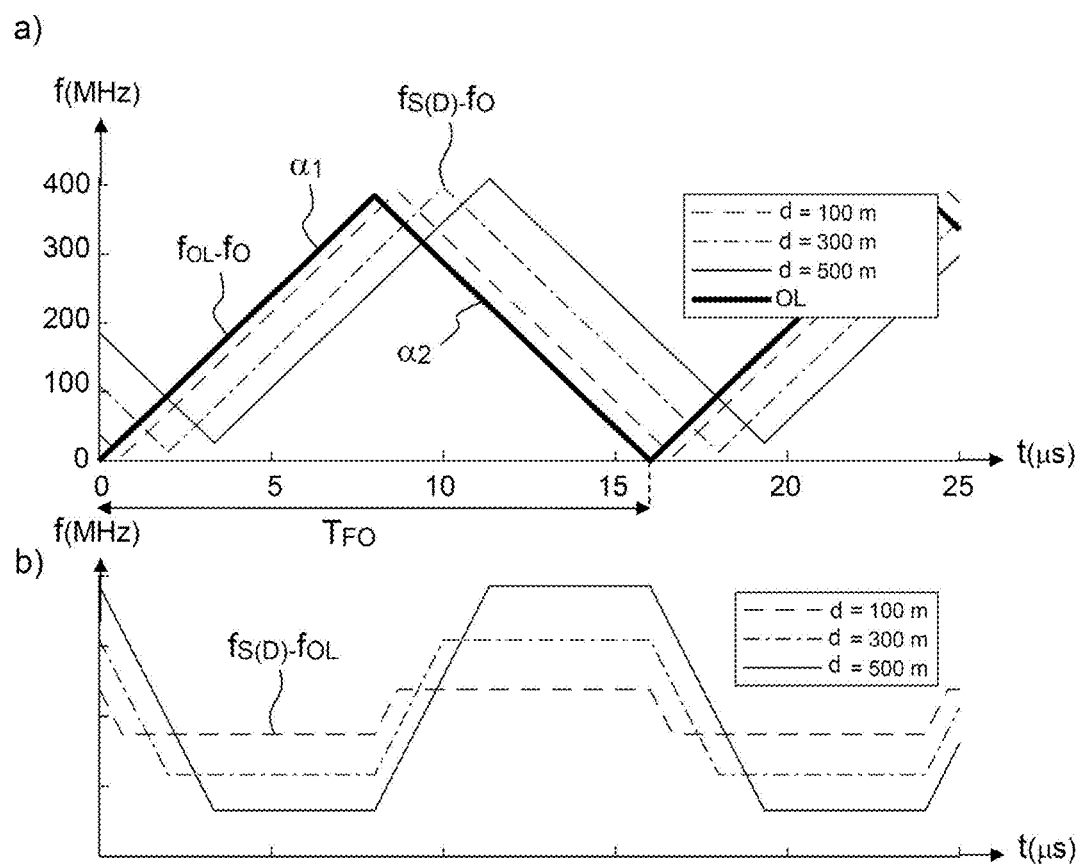
FIG. 4 illustrates waveforms and instantaneous frequency resulting from various atmospheric layers.

FIG. 4 illustrates waveforms and instantaneous frequency resulting from various atmospheric layers, taking into account delay and Doppler shift. For the computation, $T_{FO}$=16 µs, and the backscattered signal was computed for 3 distance values, 100, 300 and 500 m.

Figure a) at the top illustrates the emitted optical frequency, which is identical to that of the local oscillator $f_{OL}$, and the optical frequencies fs(D), which are time-shifted due to the round trip time to the various layers of fluid that are located at various distances D and frequency-shifted by the Doppler effect. For greater legibility, these frequencies have been shifted from the average optical frequency f0 of the laser. In this example, K=2, that is to say 2 slopes α1 and α2 with α2=−α1, and $T_{FO}$=16 µs.

Figure b) at the bottom illustrates the instantaneous frequency of the interference between the local oscillator OL (frequency $f_{OL}$) and the signal S from the various atmospheric layers. At a time t, the beat signal is a superposition of signals of various instantaneous frequencies [fs(D)−$f_{OL}$] coming from the various distances.

The idea is to use the signal from the edges between the frequency plateaus illustrated in FIG. 4 b). To resolve the time/velocity ambiguities described in the prior art, the principle of the method according to the invention consists in analyzing the backscattered signal at the times for which, after a round trip to an atmospheric layer close to the lidar, this signal undergoes a change in frequency slope whereas, for more distant atmospheric layers, the backscattered wave retains the same frequency slope value.

Thus, step by step, it is possible to reconstruct the velocity profile of the fluid along the lidar axis (illumination axis) v(d). The method according to the invention adopts the technological bricks of the FMCW lidar for telemetry/velocimetry on a hard target, while adapting the waveform and the signal processing in order to determine pairs (d, v) for the lidar illuminating a fluid consisting of a multitude of backscattering layers.

Usually, in the case of a hard target, only the frequency plateaus are exploited (see above), the transition regions between the plateaus leading to a parasitic signal that is generally negligible as it is distributed over multiple frequency bins. Conversely, in the method according to the invention, only these transition regions are exploited. Indeed, in FIG. 4 b), it will be noted that the transition time between the plateaus is associated with the distance from the origin of the signal. Thus, the "bottom" plateau of the frequency of the signal coming from 100 m logically starts before those associated with the more distant atmospheric layers (cf. for example around t=0.5 µs). Symmetrically, the "top" plateau also arrives earlier (cf. around t=8 µs). This shift may therefore be used to obtain a spatial resolution, and this approach is novel. The velocity measurement is conventionally obtained by analyzing the Doppler shift.

Figure 5:
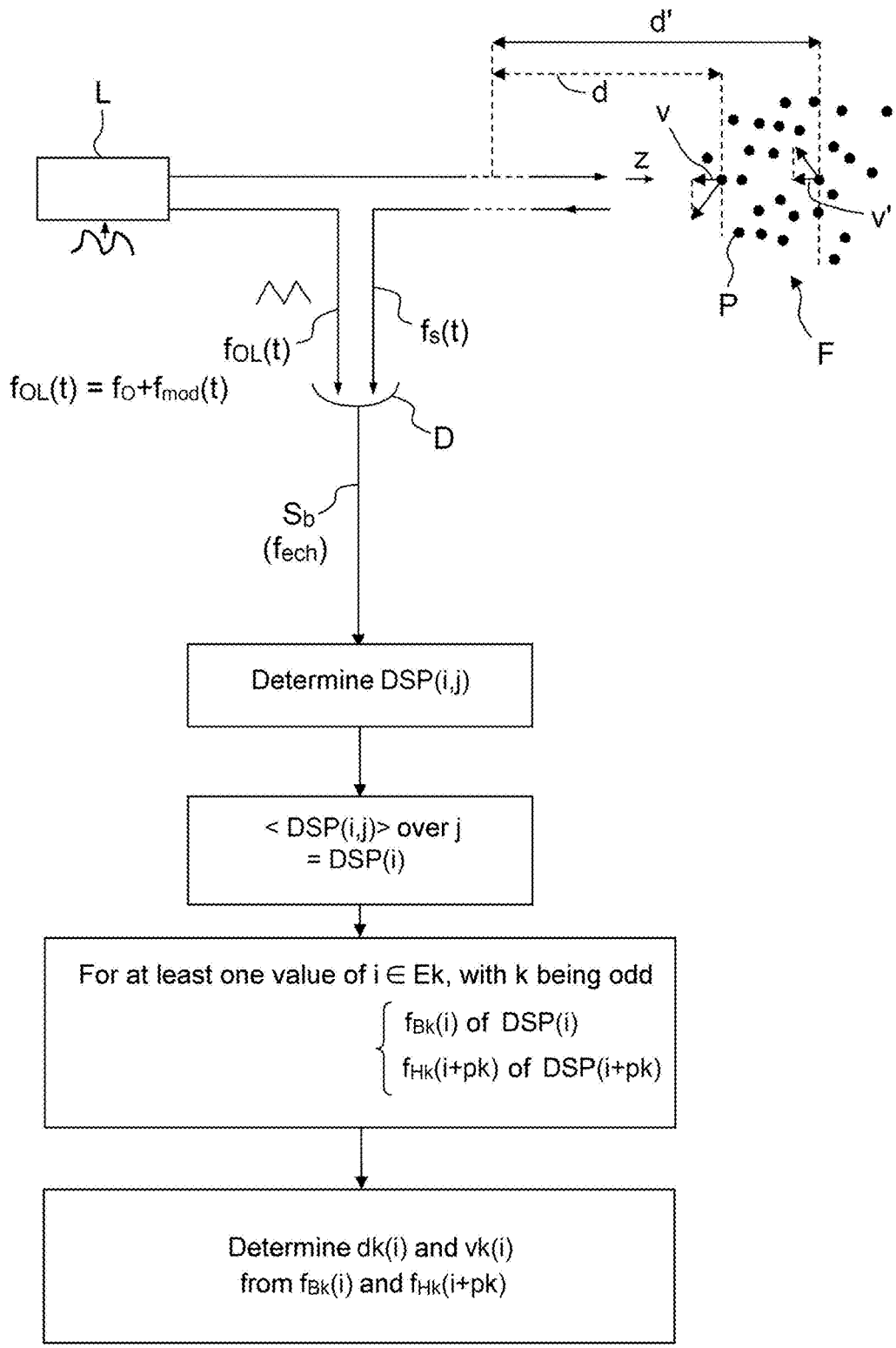
FIG. 5 illustrates the processing method according to the invention.

The processing method according to the invention is illustrated in FIG. 5. The detected beat signal Sb is first, and conventionally, digitized at a sampling frequency $f_{ech}$. This frequency is typically relatively high, between 100 MHz and 2 GHz. The beat signal is sampled over a period, called integration time TI, at least equal to M times the modulation period $T_{FO}$, and the sampled modulation period is indexed j, j varying from 1 to M: $T_{FO}(j)$.

A first step A comprises decomposing each period $T_{FO}(j)$ into a plurality of intervals indexed i, i varying from 1 to N (preferably, N is even) and determining, for each interval Iij, an elementary power spectral density DSP(i,j) of the beat signal over the interval. There are $N_{FFT}$ sampling points per interval Iij. In the following simulations, by way of example, $f_{ech}$=512 MHz, and there are N=32 measurement points per period $T_{FO}$, that is to say an interval Iij of duration 0.5 µs comprising $N_{FFT}$=256 sampling points. Preferably, each elementary power spectral density is determined from a fast Fourier transform (FFT) of the beat signal.

Figure 6:
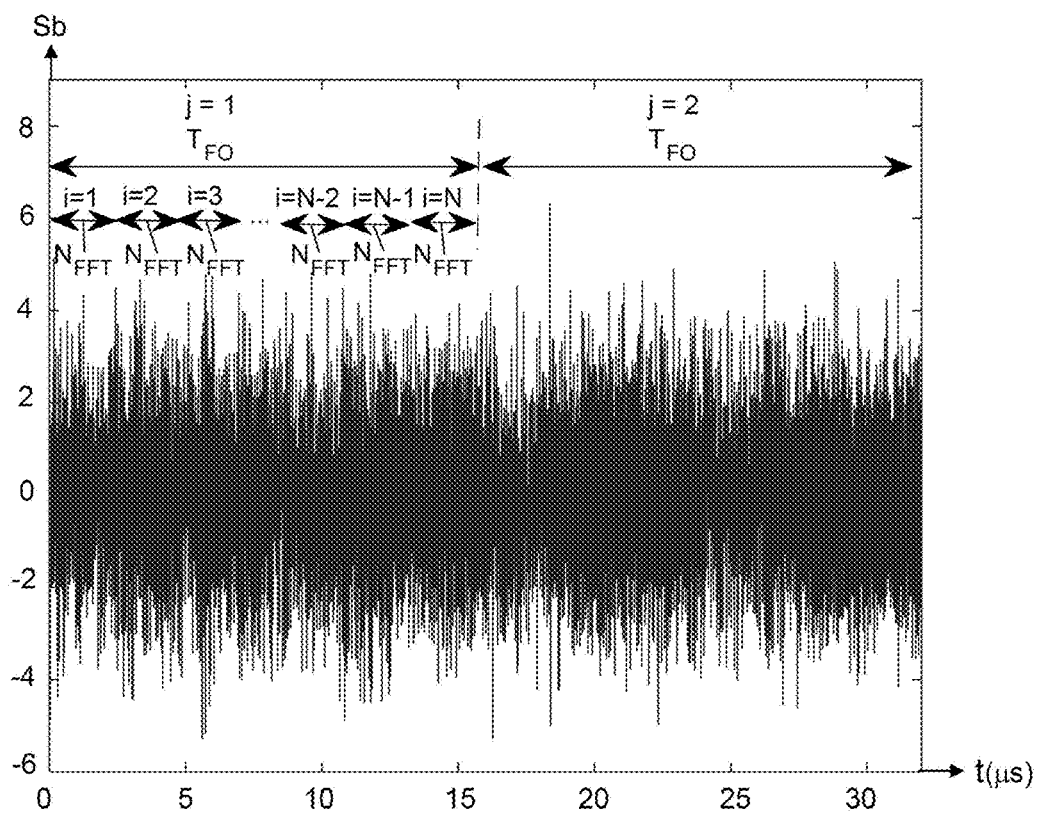
FIG. 6 illustrates the time signal Sb detected over two modulation periods.
Figure 7:
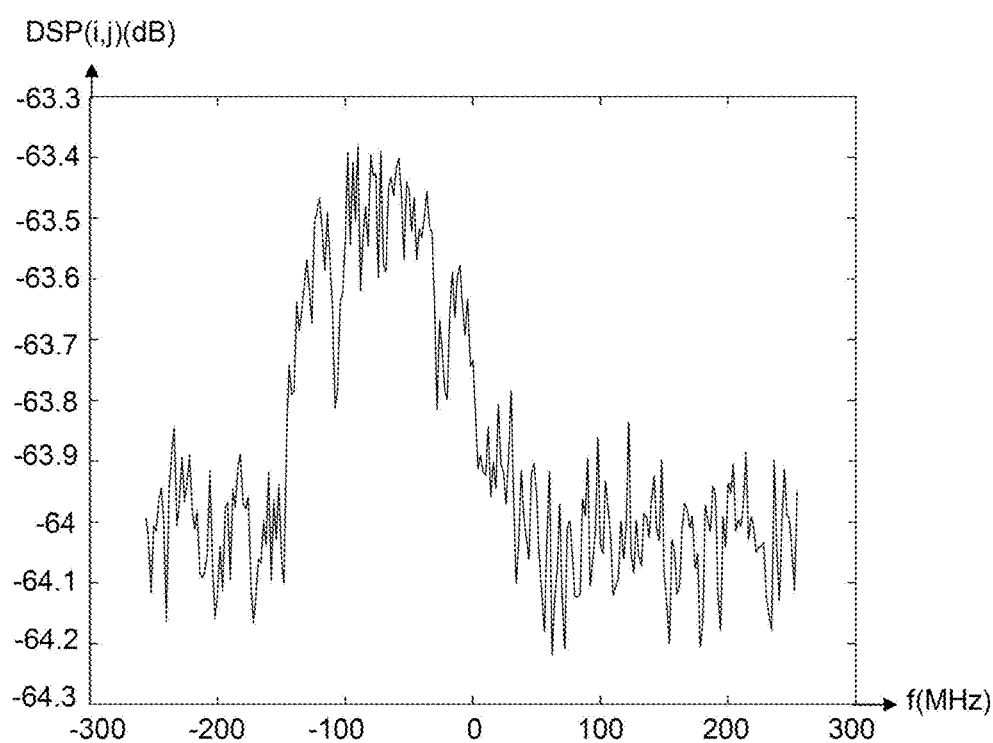
FIG. 7 illustrates one example of an elementary power spectral density DSP(i,j) determined from the time signal over the interval Iij.

FIG. 6 schematically shows the time signal Sb over two modulation periods in arbitrary amplitude units (taking into account the possible presence of a voltage amplifier), and FIG. 7 illustrates one example of an elementary power spectral density DSP(i,j) determined from the time signal over the interval Iij.

For this simulation (and the following ones), the atmosphere was considered to be charged with aerosols as fluid F, and a predetermined aerosol density and velocity map was considered for each of the layers of air (v=$f_{theo}$(d)). From these starting data, light propagation/scattering software was used to determine the backscattered signals and the detected beat signal.

A step B then comprises determining an average power spectral density over j DSP(i):

$$DSP(i) = <DSP(i,j)> \text{ over } j.$$

Typically, the integration time is of the order of around ten ms, in the example TI=50 ms, that is to say M=3125.

Figure 8:
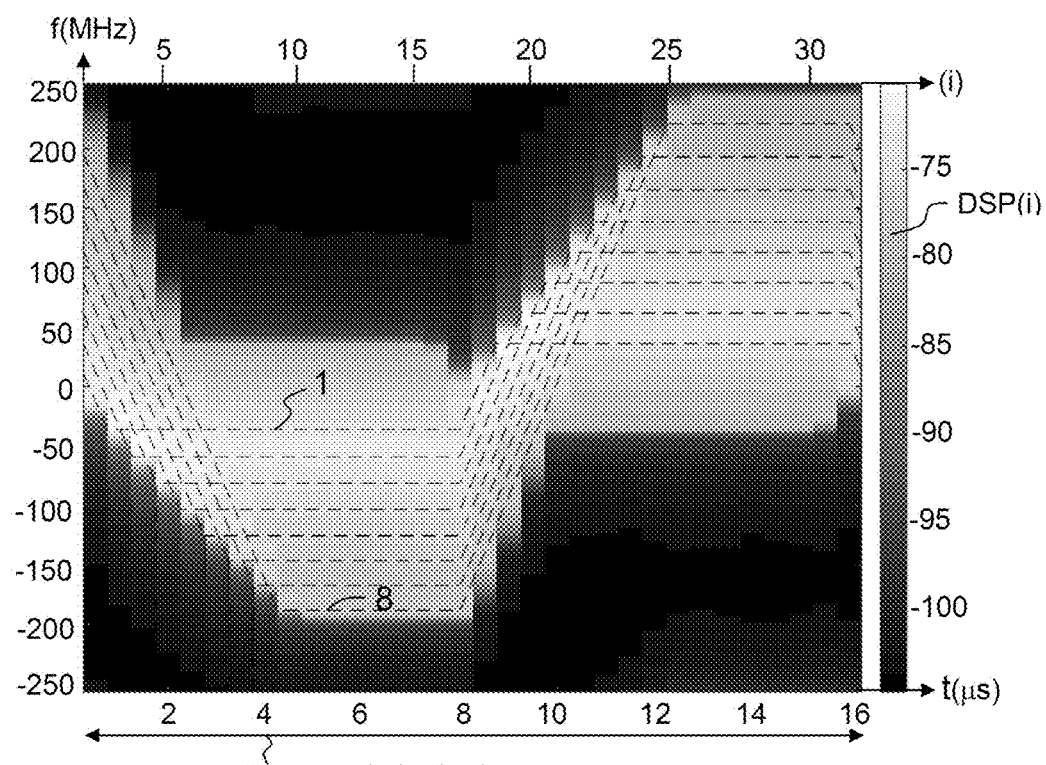
FIG. 8 illustrates a spectrogram showing the various DSP(i), for a perfect detection.

The various DSP(i) may be visualized by a spectrogram as illustrated in FIG. 8, which shows the various time intervals Ii (scaled in values of i or in time) on the abscissa, and the frequency values and, in grayscale, the various values adopted by the power density DSP(i) on the ordinate.

Figure 9:
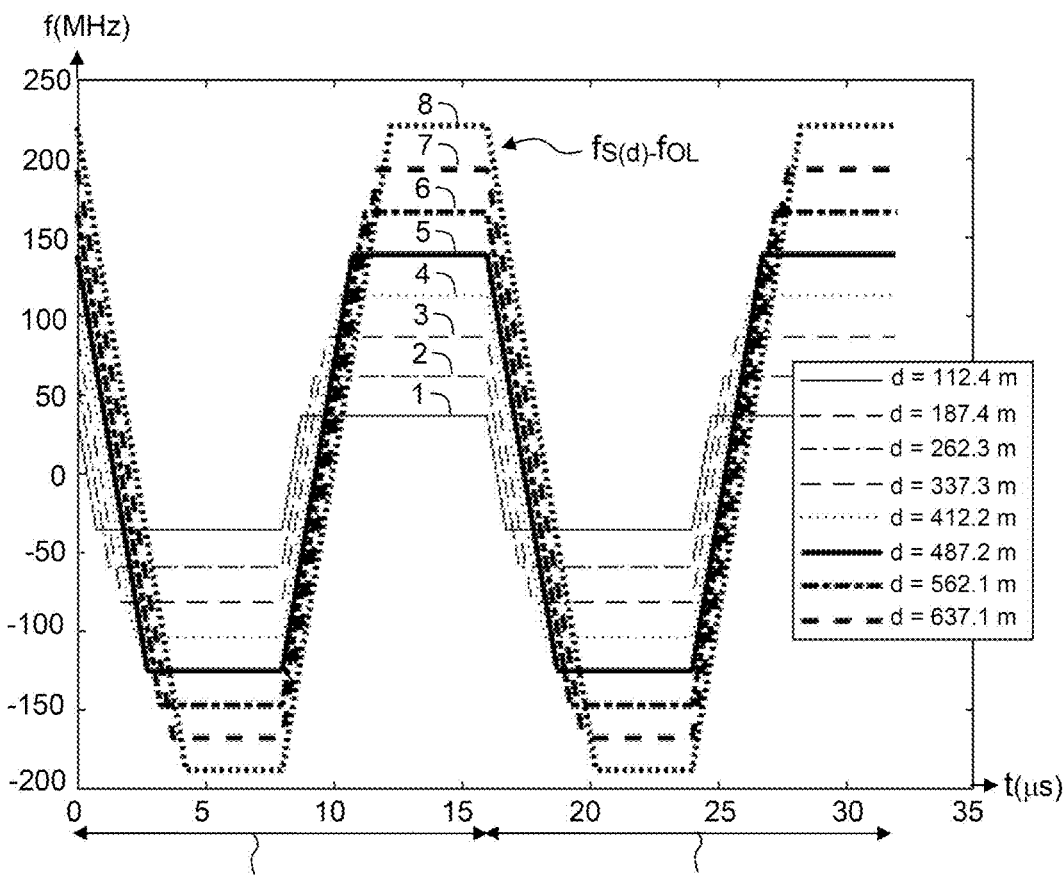
FIG. 9 illustrates the temporal evolution of the instantaneous frequency for various values of the measurement distance.

In this FIG. 8, the detection is assumed to be perfect, that is to say noiseless. The curves 1 to 8 in FIG. 9 illustrate the temporal evolution of the instantaneous frequency fs(d) for 8 values of d between 100 and 640 m, determined by simulation (2 slopes with α2=−α1). These curves are superimposed on the DSP(i) in FIG. 8 for didactic reasons. In practice, the temporal evolution of the instantaneous frequencies fs(d) is not known.

Figure 10:
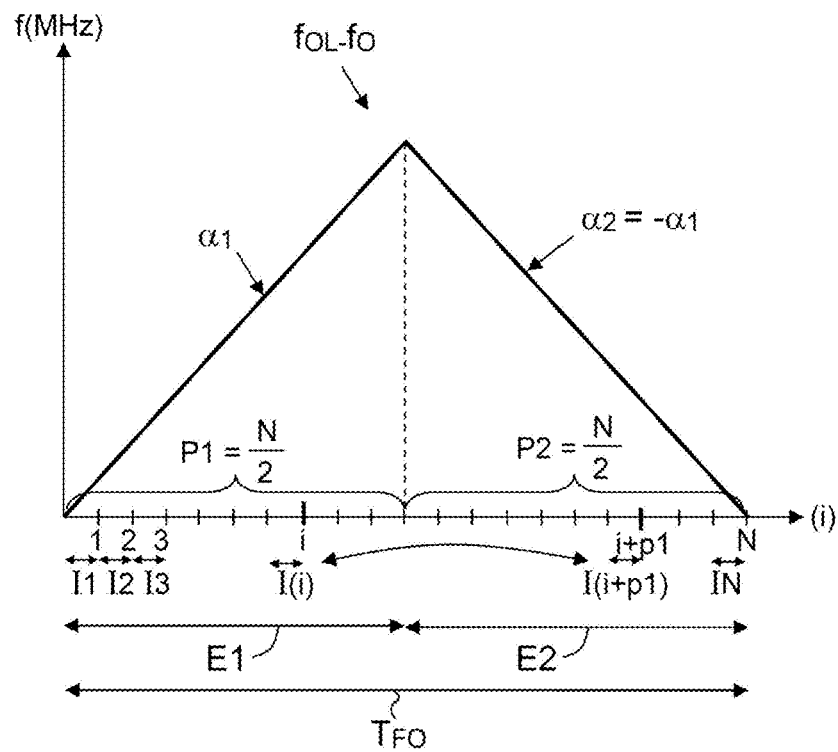
FIG. 10 illustrates the decomposition of a modulation period into K intervals Ek for K=2.
Figure 11:
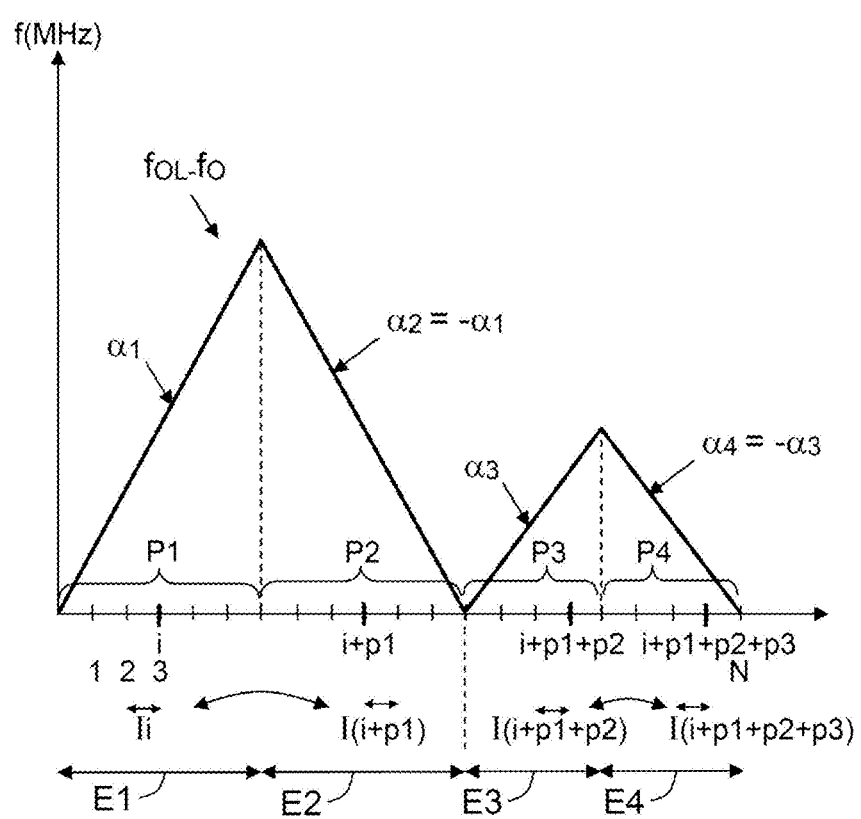
FIG. 11 illustrates the decomposition of a modulation period into K intervals Ek for K=4.

For the rest of the computation, the N values of i are distributed over $T_{FO}$ into K intervals Ek, an interval Ek corresponding to a slope value $\alpha_k$ and comprising $p_k$ values of i, as illustrated in FIG. 10 for K=2 and FIG. 11 for K=4.

For K=2, there are only 2 intervals E1 and E2, and p1=p2=N/2 (α2=−α1), in the example p1=p2=16.

Figure 12:
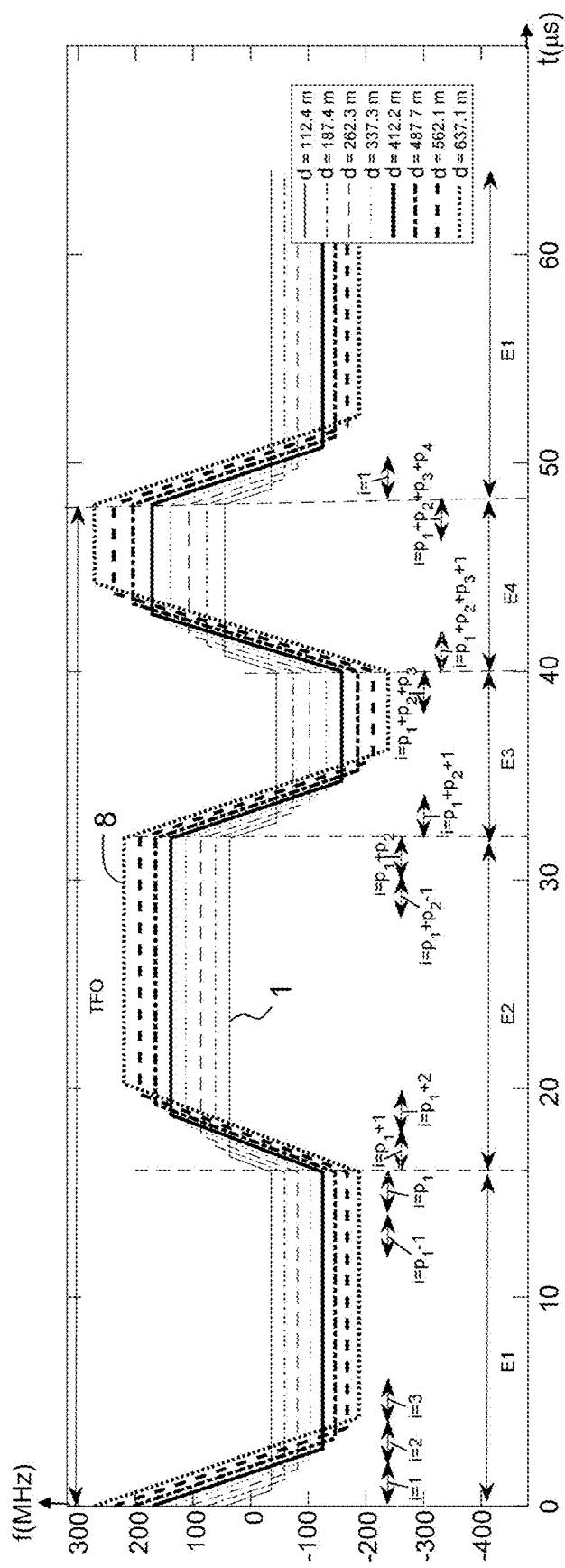
FIG. 12 illustrates the distribution of the intervals Ek for K=4 as a function of variations in the instantaneous frequencies.

For K=4, there are 4 intervals E1, E2, E3, E4, with p1=p2 and p3=p4. FIG. 12 illustrates the distribution of the intervals Ek for K=4 as a function of the variations in the instantaneous frequencies (curves 1 to 8 of FIG. 9). In this example, p3=p1/2.

A step C comprises determining, for at least one value of i within the interval Ek, with k being odd, a lower bound, called $f_{Bk}(i)$, of the average power density DSP(i) and an upper bound, called $f_{Hk}(i+pk)$, of the average power density DSP(i+pk).

For K=2, 2 slopes α2=−α1, only one interval Ek, k being odd: E1, and for i∈E1, $f_{B1}(i)$ and $f_{H1}(i+p1)$ are determined.

The inventors have demonstrated that, due to the time shift of the various plateaus as explained above, these two lower and upper bounds are equal to the characteristic frequencies of the lidar measurement (per pair of slopes).

And therefore, a step D comprises determining, for said value of i, a distance dk(i) and a velocity of the fluid vk(i) at the distance dk(i) from the pair of values ($f_{Bk}(i)$, $f_{Hk}(i+pk)$). i thus appears as a dummy variable that makes it possible to determine a distance/velocity pair that characterizes the fluid under observation.

For 2 slopes, the frequencies $f_B(i)$ and $f_H(i+p1)$ are respectively equal to the frequencies $v_{\alpha 1}$ and $v_{\alpha 2}$ from equation (1), and it is deduced from this:

$$\begin{cases} d_i = \dfrac{c}{4\alpha_1}[f_H(i+p_1) - f_B(i)] \\ v_i = \dfrac{\lambda}{4}[f_H(i+p_1) + f_B(i)] \\ i \in [1; p_1] \end{cases} \quad (2)$$

Shifting the measurement of $f_B$ and of $f_H$ by an index p1 makes it possible to guarantee that the two frequency measurements relate to the same time shift between the break in the frequency slope of the local oscillator and that of the same layer of fluid. These two measurements therefore correspond to the same distance.

Obtaining a pair (di,vi) from these limit frequencies is a completely novel result. Indeed, these relationships are usually used for a single value of distance and velocity. Simultaneously using the time shift of a break in a frequency slope of the waveform and these relationships to determine a plurality of distances and velocities constitutes the originality of the invention. The measurement of the frequency plateaus, as commonly carried out in hard target telemetry, cannot, as described above, be carried out given the superimposition of frequencies resulting from different distances. The originality therefore consists in measuring this plurality of portions of frequency plateaus over successive time intervals for which the various components appear successively based on the time shift generated by the propagation of the break in the frequency slope to different distances.

Thus, unlike the prior art, which searches for frequency peaks corresponding, in the time domain, to all of the frequency plateaus, the frequency information located on a plateau portion is used here, the duration of these plateau portions being set by the required distance resolution. The detection mode therefore also differs since, unlike the search for peaks in the frequency domain used for hard target telemetry, it is necessary in this principle to search for the frequency from which the power spectral densities are nonzero.

If the computation is performed for a single value of i, this will give a single measurement of a pair (d, v).

Figure 13:
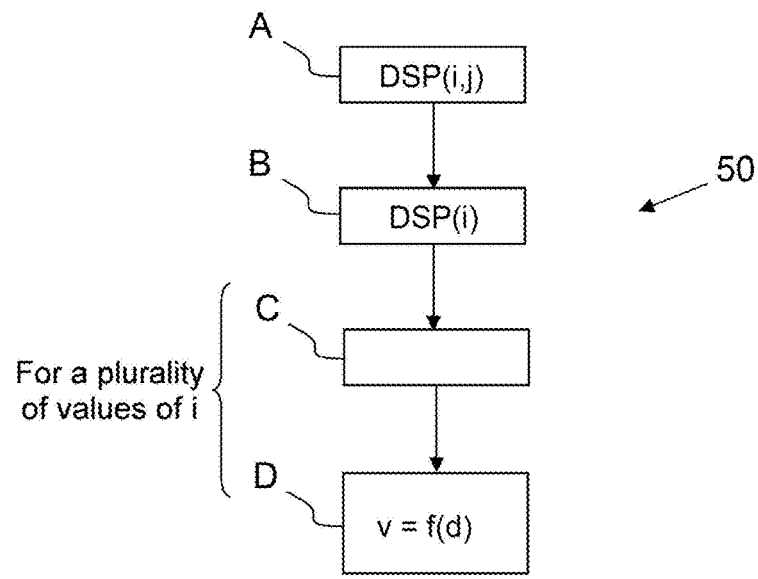
FIG. 13 illustrates one preferred variant of the method according to the invention in which the distance dk(i) and the velocity vk(i) are determined for a plurality of values of i of the interval Ek.
Figure 14:
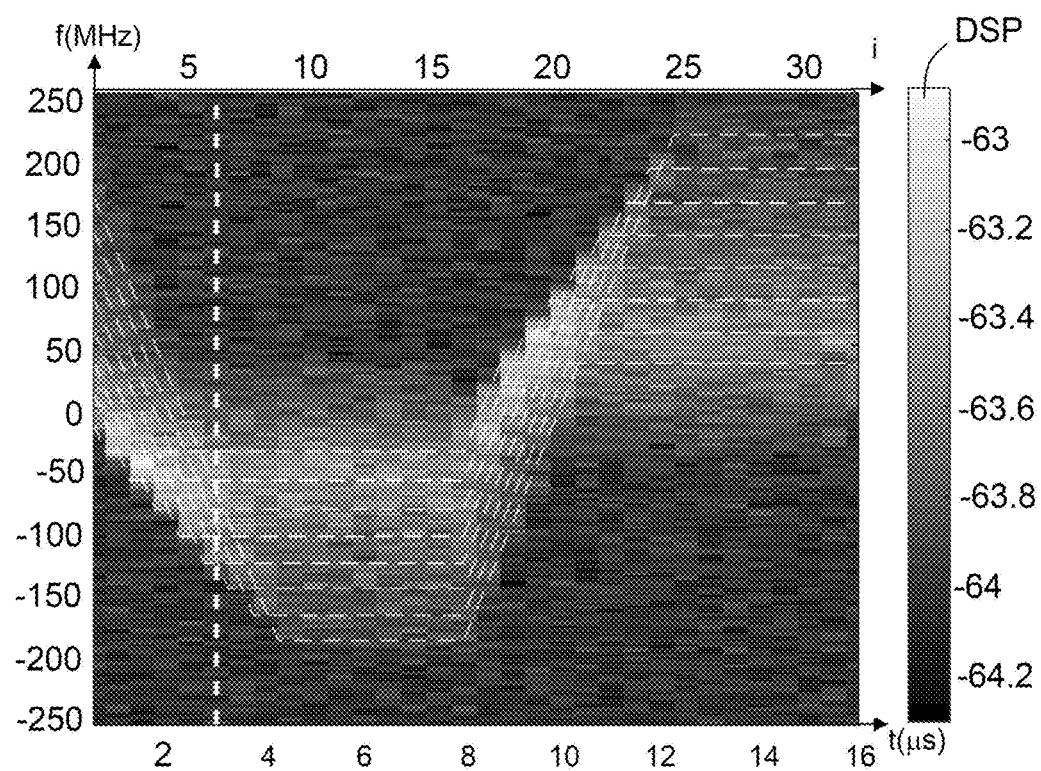
FIG. 14 illustrates a spectrogram showing the various DSP(i), taking into account detection noise.
Figure 15:
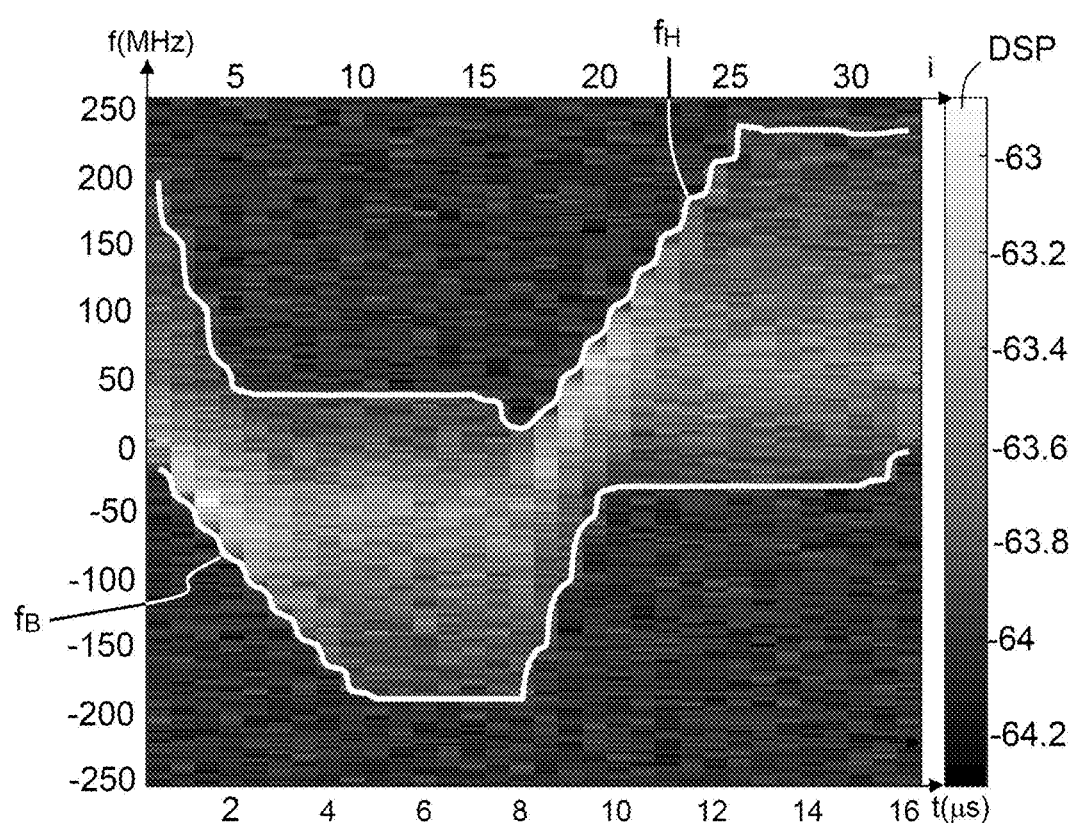
FIG. 15 illustrates the determination of the lower and upper bounds of the average power spectral densities, corresponding to the white curves $f_B$ and $f_H$, respectively.

Of course, according to one preferred variant illustrated in FIG. 13, the method 50 according to the invention is of greatest interest when determining the distance dk(i) and the velocity vk(i) for a plurality of values of i of the interval Ek under consideration, preferably all values of i, so as to obtain a function v=f(d). FIG. 14 illustrates the spectrogram of the simulation taking into account detection noise, which is non-negligible as the beat signal is weak and noisy, the sensitivity of the system being generally limited by photon noise associated with the local oscillator. FIG. 15 illustrates the determination of the lower and upper bounds of the average power spectral densities corresponding to the white curves $f_B$ and $f_H$, respectively. These curves may be obtained by contour extractions or by a conventional mathematical thresholding method.

Only the first part of $f_B$ is used, i∈[1; N/2] and only the second part of $f_H$ is used, $$i \in \left[\left(\dfrac{N}{2}\right) + 1; N\right],$$

the correspondence between the two bounds being given by: i'(for $f_H$)=i(for $f_B$)+N/2 with, in the example, N/2=p1=16 (see FIG. 10).

For the curve $f_B$, the value of i encodes the information in relation to a distance. The more the value of i increases, the more the frequency relates to a measurement at a greater distance. Beyond a certain distance, the detected signal is no longer usable, thereby giving the lidar range to which the method according to the invention is applied.

Figure 16:
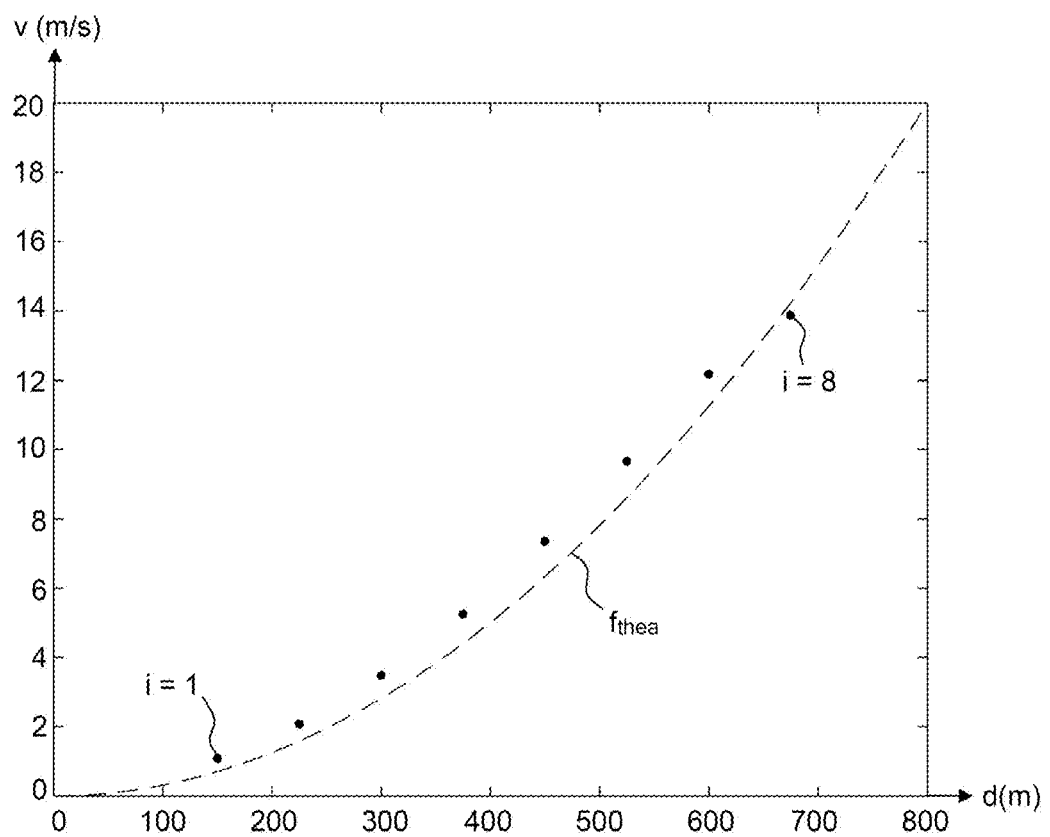
FIG. 16 illustrates the pairs (d(i), v(i)) obtained with the method according to the invention and compares them with the theoretical curve chosen for the simulation.

FIG. 16 illustrates the pairs (d(i),v(i)) obtained with formulas (2). Only the first 8 points out of 16 available ones are usable and shown. Beyond i=8, corresponding to more distant distances, the beat signal is too weak and noisy and the results that are obtained become false. The measurement points (d(i),v(i)) determined with the method according to the invention are compared with the function $v=f_{theo}(d)$ chosen for the simulation in order to compute the detected beat signal (see above). A very good match is observed, thereby validating the relevance of the method 50 according to the invention.

The measurement points in the previous figure were computed for a local oscillator frequency modulated with two slopes ($\alpha_1, \alpha_2=-\alpha_1$) as illustrated in FIG. 4 *a*) or FIG. 10.

For K=4, as illustrated in FIG. 11, there are two odd values of k, 1 and 3, and 2 pairs of bounds are determined, corresponding to the 4 characteristic frequencies of the lidar measurement in this case. It is possible to determine the pair of bounds for E1/E2 associated with $_{\alpha 1/\alpha 2}$ and/or the pair of bounds for E3/E4 associated with $_{\alpha 3/\alpha 24}$.

Figure 17:
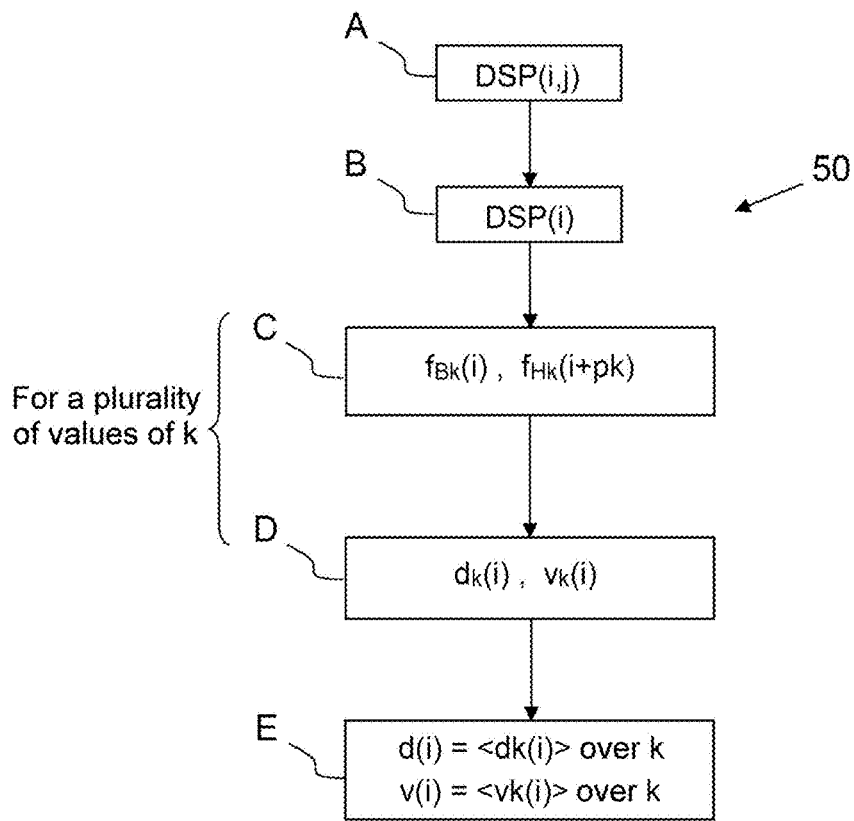
FIG. 17 describes one preferred variant of the method according to the invention for K at least equal to 4, comprising determining, for multiple odd values of k, a pair of bounds, and then a pair of characteristic frequencies, from which a pair (dk(i), vk(i)) is obtained. In this variant, an additional step E comprises determining the final distance and velocity by taking an average over the plurality of distances and the plurality of velocities, respectively.

For $i \in E1$, k=1, $[f_{B1}(i), f_{H1}(i+p1)]$ is determined and d1(*i*) and v1(*i*) are deduced therefrom For $i \in E3$, k=3, $[f_{B3}(i), f_{H3}(i+p3)]$ is determined and d3(*i*) and v3(*i*) are deduced therefrom Generally speaking, for each odd value of k and the associated slope pair ($\alpha_k, \alpha_{k1}$), there are two characteristic frequencies that make it possible to determine dk(i) and vk(i). According to one preferred variant illustrated in FIG. 17, a pair of bounds is determined for multiple odd values of k, preferably for all available odd values of k, followed by a pair of characteristic frequencies, from which a pair (dk(i), vk(i)) is obtained. An additional step E comprises determining the final distance and velocity by taking an average over the plurality of distances and the plurality of velocities, respectively:

$$d(i)=<dk(i)> \text{over } k$$

$$v(i)=<vk(i)> \text{over } k$$

With K=4, if it is desired to determine two pairs of bounds respectively on E1/E2 and E3/E4, taking the value of i belonging to the first interval E1 as reference, the correspondence relationship between the value of $i \in E1$ and the value $i'' \in E3$ to be taken into account for determining the pair of bounds is given by:

$$i''(\text{for } f_{B3})=i(\text{for } f_{B1})+p1+p2$$

$f_{B3}(i+p1+p2), f_{H3}(i+p1+p2+p3)]$, with $i \in E1$ (see FIG. 11) are thus determined for E3/E4.

In the example of FIG. 11, p1=p2=6 while p3=p4=4. For $i \in E1$, an average over the pairs $[d1(i), v1(i)]$ and $[d2(i+p1+p2), v2(i+p1+p2+p3)]$ is only possible for values of i from 1 to 4: the measurement points i=5 and i=6 have no equivalent in the interval E3. Thus, when taking an average over k, information is obtained for the common measurement points between all of the intervals Ek, k being odd. Preferably, to be able to take an average over k over all available measurement points i, $p_{k+2}=p_k$, that is to say for K=4 p1=p3.

Generalizing, to deduce a distance-velocity pair $d_k, v_k$ with k being odd, it is necessary to take into account DSP(i) with i within the interval:

$$\left[1+\sum_{q=1}^{k-1} p_q ; \sum_{q=1}^{k} p_q\right]$$

Where $p_k$ denotes the number of FFTs associated with the set Ek corresponding to a slope $\alpha_k$.

$$p_k = \frac{T_k \cdot f_{ech}}{N_{FFT}}$$

In particular:

where $T_k$ denotes the duration of the interval Ek, that is to say the duration for which the slope $\alpha_k$ is applied in the waveform.

The frequency shift associated with the distance from the atmospheric layers is greater than the maximum Doppler shift to be measured. In this case, subject to numbering the slopes such that $\alpha_1$ is positive (increasing slope), then it is always necessary to consider:

$$f_B(i+\Sigma_{q=1}^{k-1} p_q) \text{ and } f_H(i+\Sigma_{q=1}^{k} p_q)$$

to determine $d_k, v_k$, with k being odd and $i \in [1; p_1]$.

This gives, for computing d(k,i) and v(k,i):

$$\begin{cases} d_{k,i} = \dfrac{c}{4\alpha_k}\left[f_H\left(i+\sum_{q=1}^{k} p_q\right) - f_B\left(i+\sum_{q=1}^{k-1} p_q\right)\right] \\ v_{k,i} = \dfrac{\lambda}{4}\left[f_H\left(i+\sum_{q=1}^{k} p_q\right) + f_B\left(i+\sum_{q=1}^{k-1} p_q\right)\right] \\ \quad i \in [1; p_1] \end{cases}$$

Thus, regardless of the number of values of k over which the average is taken, and for the case pk=p, there are always N/p values of i corresponding to a measurement point of a pair (d,v).

According to one preferred application, the fluid F is the atmosphere comprising scattering particles P (such as aerosols), the method 50 according to the invention then making it possible to determine a wind profile along an illumination axis of the lidar Z. The method may be used for terrestrial, airborne and space applications of this type of measurement.

Wind profile measurement along an axis using a frequency-modulated continuous-wave coherent lidar is applicable for example to snipers, to wind turbines or to ship trajectory optimization.

Snipers need a wind measurement along the firing axis (as well as the crosswind) to accurately adjust their shots. To obtain a more complete vector map of the wind, the lidar illumination angle is scanned along multiple axes Z.

For this sniper application, the typical range of the instrument is 0.5-2 km, over which the wind must be measured with high accuracy (typically 0.2 m/s). The required distance resolution is then of the class of 100 m. These parameters (and those resulting therefrom) must of course be adapted according to the application, and systems with longer ranges may be achieved subject to increasing the available power. The proposed method 50 is particularly suitable when the need for compactness is great.

Other applications are:
characterization of underwater currents (fluid is water)
characterization of biological fluids, in a biomedical imaging context (biomedical Doppler imaging, acousto-optical imaging of scattering media).

The dimensioning of the lidar is dependent on the desired distance resolution $\delta R$ or velocity resolution $\delta V$.

In the method according to the invention, the frequency bin of the FFT (resolution) is linked to the velocity resolution $\delta V$ (conventionally) and to the distance resolution $\delta R$ (novel). In particular, the processing imposes the following relationships:

for a chosen distance resolution δR:

$$2 \cdot \delta R = \frac{c \cdot N_{FFT}}{f_{ech}}$$

for a chosen velocity resolution δV:

$$\frac{f_{ech}}{N_{FFT}} = \frac{2 \cdot \delta V}{\lambda}$$

where C is the speed of light and λ is the wavelength of the coherent source.

The measured Doppler shift resolution (and therefore, proportionally, the velocity resolution) is indeed greater than the width of a frequency bin in the time-frequency analysis performed by FFT and the time-of-flight resolution (and therefore, proportionally, the distance resolution) is greater than the time between two measured signal samples.

In the method according to the invention, the distance and velocity resolutions are linked by the relationship:

$$\delta R \cdot \delta V = C \cdot \lambda / 4$$

The duration of a frequency slope corresponds to the number of distance-resolved points multiplied by the duration of an FFT:

$$\frac{T_{FO}}{K} = \frac{2 \cdot R_{max}}{\delta R} \cdot \frac{N_{FFT}}{f_{ech}} = 2 \cdot \frac{R_{max}}{c}$$

With $R_{max}$ being the range of the equipment, that is to say the greatest possible measurement distance.

The maximum velocity measurable by the method $v_{max}$ is limited by the values of the slopes $\alpha_k$. For a predetermined measured velocity $v_{max}$, the following condition exists:

$$\alpha_k > \frac{2 v_{max}}{\lambda} \cdot \frac{f_{ech}}{N_{FFT}}$$

Another limitation on the distance resolution is linked to the frequency excursion band of the waveform, which must be lower than that linked to the duration of the FFT, that is to say:

$$\frac{2 \cdot \alpha \cdot \delta R}{c} < \frac{2 \cdot f_{ech}}{N_{FFT}}$$

One dimensioning example, for a range of the class of Rmax=500 m, is:
- small FFTs (typically $N_{FFT}$=256 points) for a relatively high sampling frequency (typically $f_{ech}$=500 MHz). The velocity resolution δV is then of the class of 1 m/s, and the distance resolution δR is of the order of 75 m at 1.5 µm.
- a relatively short waveform period (typically $T_{FO}$=16 µs for 2 slopes and p1=p2=16 velocity measurement points),
- relatively high frequency slopes (typically αk>20 MHz/ µs).

It should be noted that the method according to the invention assumes that the backscattered signals are relatively large, that is to say with high SNRs. This method is particularly suitable for low layers, with a high aerosol concentration.

According to one embodiment and in a conventional manner, the processing implemented in the method according to the invention is encoded in an FPGA or in an ASIC.

According to another aspect, the invention relates to a coherent lidar system 200 comprising:
- a periodically frequency-modulated coherent source L,
- an emission device DE for emitting an optical signal from the coherent source and a reception device DR for receiving a signal backscattered by a moving fluid F illuminated by the lidar,
- a photodetector D configured to generate the beat signal Sb from the interference between an optical signal, called local oscillator, having a local oscillator frequency $f_{OL}(t)$ and the backscattered optical signal, the local oscillator frequency $f_{OL}(t)$ consisting of the sum of an average value f0 and a modulation frequency $f_{mod}(t)$ resulting from the modulation of the coherent source, the modulation frequency being periodic according to a modulation period $T_{OF}$, each period comprising K linear parts having K frequency slopes αk, respectively, K being even and greater than or equal to 2,
- a processing unit UT configured to implement the claimed method.

Figure 18:
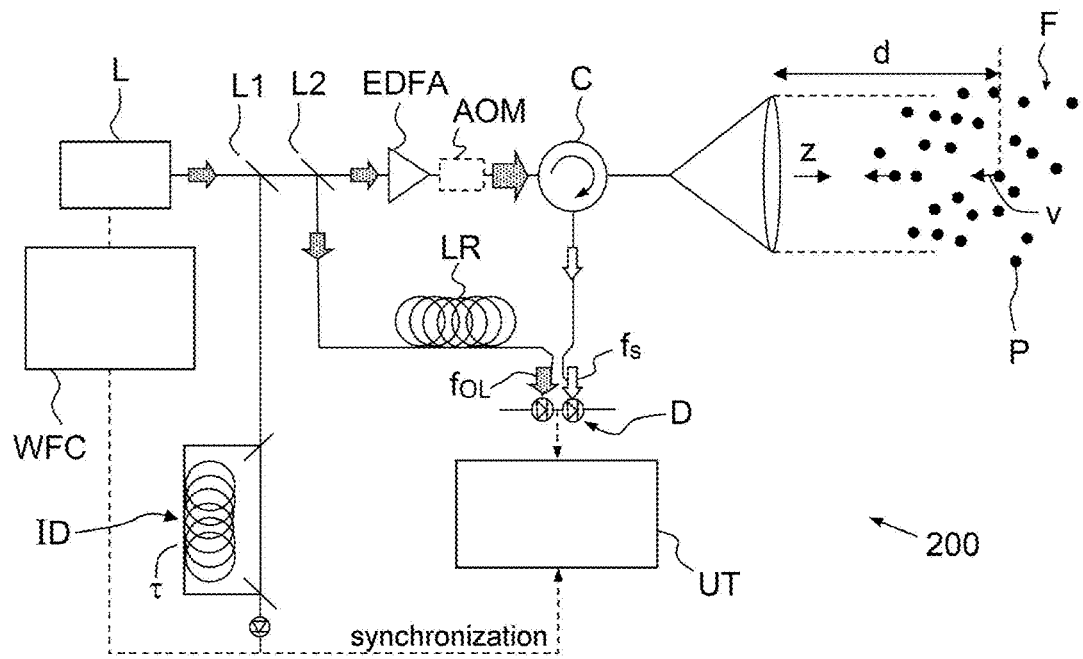
FIG. 18 illustrates a first variant of the lidar according to the invention.

A first variant of the lidar 200 according to the invention is monostatic and illustrated in FIG. 18. From a hardware point of view, this lidar is identical to the one in FIG. 2. It comprises an isolator C, preferably a circulator, and an amplifier EDFA for amplifying the coherent source. It optionally comprises an acousto-optic modulator AOM for frequency-shifting the emission signal.

Conventionally, the calibration of the waveform (a form of temporal modulation of the frequency emitted by the source) is fundamental and is typically carried out using an unbalanced interferometer ID, which measures the optical frequency at the output of the laser. The lidar 200 also comprises a first sampling component L1 for directing a fraction of the source toward the unbalanced interferometer ID and a second sampling component L2 for implementing the local oscillator.

In this diagram, the components L1 and L2 are located upstream of the amplifier so as to maximize the power emitted and reduce the noise that the amplifier might generate during waveform calibration. This architecture requires a delay line LR inserted on the local oscillator to compensate for the optical delay associated with the amplifier (that is to say to equalize the optical paths of the local oscillator and the emission signal). This delay line LR is generally lengthy (typically 10-30 m). This first lidar variant may be implemented using fiber technology, but obtaining such a delay line remains problematic using integrated technology (due to losses).

Figure 19:
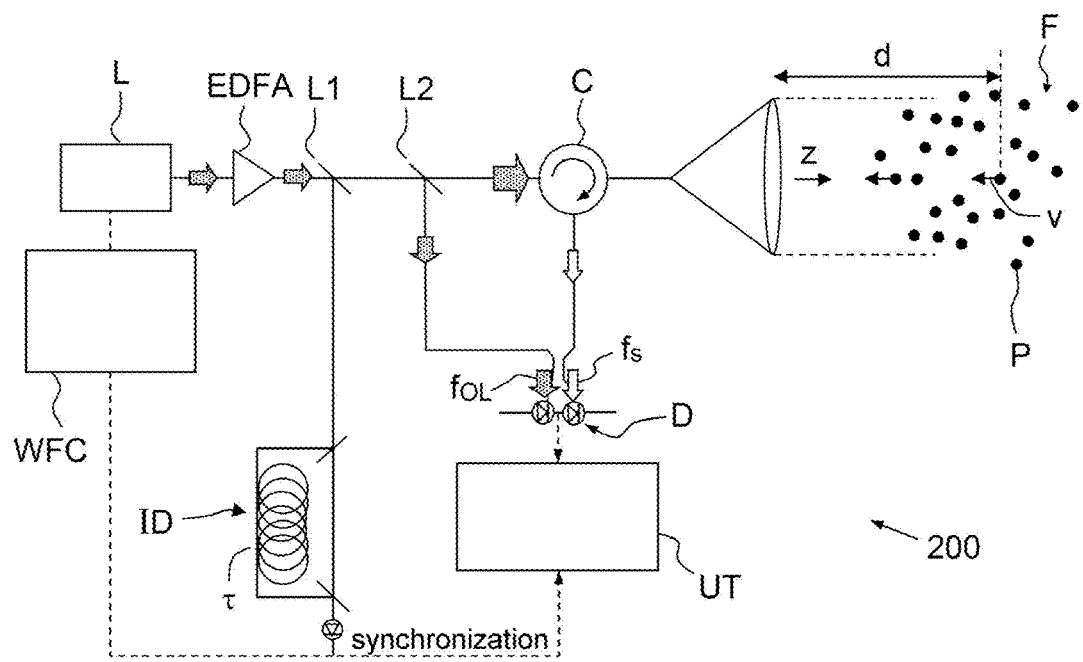
FIG. 19 illustrates a second variant of the lidar according to the invention.

FIG. 19 illustrates a second lidar variant according to the invention. In this variant, the sampling of the local oscillator takes place downstream of the EDFA, as does the reference for calibrating the waveform: the first and the second sampling components L1 and L2 are arranged downstream of the amplifier. One advantage of this second variant is the possibility of more significant integration than for the first variant. The delay line of FIG. 18, the purpose of which is to compensate for the delay associated with propagation in the EDFA, is removed. According to one embodiment, the two sampling slides L1 and L2 as well as the isolator C are produced using micro-optical technology (for which the power withstand does not limit the power emitted). The rest of the optical functions are then used at low power:

The local oscillator typically has a power of 1 to 10 mW,
The power required in the unbalanced interferometer is typically of the class 1 mW
The backscattered signal depends on the characteristics of the laser and the intended target, but it very generally remains well below 1 mW.

According to one embodiment, the interferometer ID and the detector (which is preferably balanced and preferentially of the I/Q type) are then produced as a photonic integrated circuit (PIC).

The emission/reception module (all of the components except for the source, its amplifier and the waveform control device WFC, and the processing unit) is then highly compact, produced using PIC technology or using hybrid micro-optical/PIC technology.

Ultimately, it is conceivable to integrate electronic functions for carrying out all or part of the signal processing (integration of all or part of the processing unit).

This significant integration guarantees a minimum volume of the lidar, which is compatible with a sniper application, for example.

The invention claimed is:

1. A method (50) for processing a signal from a coherent lidar comprising a periodically frequency-modulated coherent source (L),
a beat signal (Sb) being generated by a photodetector (D) from the interference between an optical signal, called local oscillator, having a local oscillator frequency (fOL(t)) and an optical signal backscattered by a moving fluid (F) illuminated by the lidar,
the local oscillator frequency (fOL(t)) consisting of the sum of an average value (f0) and a modulation frequency (fmod(t)) resulting from the modulation of the source, the modulation frequency being periodic according to a modulation period ($T_{FO}$), each period comprising K linear parts having K frequency slopes indexed $\alpha_k$, respectively, K being even and greater than or equal to 2,
said beat signal being digitized at a sampling frequency $f_{ech}$ over a duration at least equal to M times the modulation period, a sampled modulation period being indexed j, j varying from 1 to M,
the method comprising the following steps:
A decomposing each modulation period indexed j ($T_{FO}$ (j)) into a plurality of intervals indexed i, i varying from 1 to N, and determining, for each interval Iij, an elementary power spectral density DSP(i,j) of the beat signal over said interval,
B determining an average power spectral density over j DSP (i),
C the N values of i being distributed over $T_{FO}$ into K intervals Ek, k varying from 1 to K, an interval Ek corresponding to a slope value $\alpha_k$ and comprising pk values of i, determining, for at least one value of i within an interval Ek, with k being odd, a lower frequency bound, called $f_{Bk}(i)$, of said average power density DSP(i) and an upper frequency bound, called $f_{Hk}(i+pk)$, of the average power density DSP(i+pk),
D determining, for said value of i, a distance dk(i) and a velocity of the fluid vk(i) at said distance from said lower and upper frequency bounds (fBk(i), fHk(i+pk)).

2. The method as claimed in claim 1, wherein K=2 or K=4 and wherein $\alpha_{2k}=-\alpha_{2k-1}$.

3. The method as claimed in claim 1, wherein said distance dk(i) and said velocity vk(i) are determined for a plurality of values of i of the interval Ek, so as to obtain a function v=f(d).

4. The method as claimed in claim 1, wherein K is greater than or equal to 4, and wherein a plurality of distances and a plurality of velocities are determined, these being determined from a plurality of intervals Ek, with k being odd,
said method comprising an additional step E comprising determining a final distance and velocity by taking an average over the plurality of distances and the plurality of velocities, respectively.

5. The method as claimed in claim 4, wherein $p_{k+2}=p_k$, with k being odd.

6. The method as claimed in claim 1, wherein each elementary power spectral density is determined from a fast Fourier transform (FFT) of the beat signal.

7. The method as claimed in claim 1, wherein an interval Iij comprises $N_{FFT}$ sampling points and wherein the following relationships exist:
for a chosen distance resolution δR:

$$2 \cdot \delta R = \frac{c \cdot N_{FFT}}{f_{ech}}$$

for a chosen velocity resolution δV:

$$\frac{f_{ech}}{N_{FFT}} = \frac{2 \cdot \delta V}{\lambda}$$

where C is the speed of light and λ is the wavelength of the coherent source.

8. The method as claimed in claim 1, wherein an interval Iij comprises $N_{FFT}$ sampling points and wherein, for a predetermined measured velocity $v_{max}$, the following condition exists:

$$\alpha_k > \frac{2v_{max}}{\lambda} \frac{f_{ech}}{N_{FFT}}$$

where λ is the wavelength of the coherent source.

9. The method as claimed in claim 1, wherein said fluid (F) is the atmosphere comprising scattering particles (P), said method then making it possible to determine a wind profile along an illumination axis of the lidar (Z).

10. A coherent lidar system (200) comprising:
a periodically frequency-modulated coherent source (L),
an emission device (DE) for emitting an optical signal from the coherent source and a reception device (DR) for receiving a signal backscattered by a moving fluid (F) illuminated by the lidar,
a photodetector (D) configured to generate a beat signal (Sb) from the interference between an optical signal, called local oscillator, having a local oscillator frequency ($f_{OL}(t)$) and the backscattered optical signal, the local oscillator frequency ($f_{OL}(t)$) consisting of the sum of an average value (f0) and a modulation frequency ($f_{mod}(t)$) resulting from the modulation of the coherent source, the modulation frequency being periodic according to a modulation period ($T_{OF}$), each period comprising K linear parts having K frequency slopes (αk), respectively, K being even and greater than or equal to 2, a processing unit (UT) configured to:
  digitize the beat signal at a sampling frequency $f_{ech}$ over a duration at least equal to M times the modulation period, a sampled modulation period being indexed j, j varying from 1 to M,
  decompose each modulation period indexed j (TFO(j)) into a plurality of intervals indexed i, i varying from 1 to N, and determine, for each interval Iij, an elementary power spectral density DSP(i,j) of the beat signal over said interval,
  determine an average power spectral density over j DSP (i),
  the N values of i being distributed over TFO into K intervals Ek, k varying from 1 to K, an interval Ek corresponding to a slope value αk and comprising pk values of i, determine, for at least one value of i within an interval Ek, with k being odd, a lower frequency bound, called fBK(i), of the average power density DSP (i) and an upper frequency bound, called fHK(i+pk), of the average power density DSP(i+pk), determine, for said value of i, a distance dk(i) and a velocity of the fluid vk(i) at said distance from said lower and upper frequency bounds (fBk(i), fHk(i+pk)).

11. The coherent lidar system as claimed in claim 10, furthermore comprising an isolator (C), an amplifier (EDFA) for amplifying the coherent source and an unbalanced interferometer (ID) for measuring the optical frequency at the output of the laser, a first sampling component (L1) for directing a fraction of the source toward the unbalanced interferometer (ID) and a second sampling component (L2) for implementing the local oscillator,
  wherein the first and second sampling components (L1, L2) are arranged downstream of the amplifier.

12. The coherent lidar system as claimed in claim 11, wherein the isolator, the unbalanced interferometer and the detector are produced using micro-optics and/or wherein the unbalanced interferometer and the detector are produced as a photonic integrated circuit (PIC).

13. A computer program product, said computer program comprising code instructions for performing the steps of the processing method as claimed in claim 1.

* * * * *

UNITED STATES PATENT AND TRADEMARK OFFICE
CERTIFICATE OF CORRECTION

Page 1 of 1

PATENT NO.         : 12,313,792 B2
APPLICATION NO.    : 18/267762
DATED              : May 27, 2025
INVENTOR(S)        : Patrick Feneyrou et al.

It is certified that error appears in the above-identified patent and that said Letters Patent is hereby corrected as shown below:

In the Claims

In Claim 1, Column 15, Line 26, "A method (50)" should be -- A method --.

In Claim 10, Column 16, Line 50, "A coherent lidar system (200)" should be -- A coherent lidar system --.

Signed and Sealed this
Fifth Day of August, 2025

Coke Morgan Stewart
*Acting Director of the United States Patent and Trademark Office*